US012684341B2

(12) United States Patent
Barton et al.

(10) Patent No.: US 12,684,341 B2
(45) Date of Patent: **\*Jul. 14, 2026**

(54) PROACTIVE NOTIFICATION OF WIRELESS CLIENT ADDRESS ROTATION

(71) Applicant: Cisco Technology, Inc., San Jose, CA (US)

(72) Inventors: Robert E. Barton, Richmond (CA); Jerome Henry, Pittsboro, NC (US); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,104

(22) Filed: Mar. 27, 2024

(65) Prior Publication Data

US 2024/0236656 A1      Jul. 11, 2024

Related U.S. Application Data

(63) Continuation of application No. 17/976,124, filed on Oct. 28, 2022, now Pat. No. 12,041,694, which is a continuation of application No. 17/329,819, filed on May 25, 2021, now Pat. No. 11,540,116.

(51) Int. Cl.
| | |
|---|---|
| *H04W 8/28* | (2009.01) |
| *H04L 12/46* | (2006.01) |
| *H04W 68/00* | (2009.01) |

(52) U.S. Cl.
CPC ........... *H04W 8/28* (2013.01); *H04L 12/4679* (2013.01); *H04W 68/005* (2013.01)

(58) Field of Classification Search
CPC ....... H04W 8/28; H04W 8/26; H04W 68/005; H04L 12/4679; H04L 61/103; H04L 61/5038; H04L 61/5092; H04L 61/58; H04L 2101/622
See application file for complete search history.

(56) References Cited

U.S. PATENT DOCUMENTS

| | | | | |
|---|---|---|---|---|
| 6,466,964 | B1 | 10/2002 | Leung et al. | |
| 7,971,253 | B1 * | 6/2011 | Gupta | H04L 63/1416 |
| | | | | 726/11 |
| 10,212,583 | B1 * | 2/2019 | Hooda | H04W 8/26 |
| 10,805,982 | B1 | 10/2020 | Buckley et al. | |
| 2002/0174364 | A1 | 11/2002 | Nordman et al. | |

(Continued)

*Primary Examiner* — Stephen J Clawson
(74) *Attorney, Agent, or Firm* — Edell, Shapiro & Finnan, LLC

(57) ABSTRACT
A network controller provides proactive notification of a wireless client device's address rotation to layer 2 (L2) and/or layer 3 (L3) devices. Traditional methods of device address discovery rely on broadcasting of address queries across a plurality of links until a path to a device having the queried address responds. As device address changes become more frequent in an effort to improve user privacy, traditional methods of address discovery impose a large burden on networks, reducing their performance and efficiency. By proactively propagating address changes to upstream devices, the need for broadcast oriented address discovery techniques is reduced, resulting in improved network performance.

20 Claims, 9 Drawing Sheets

(56)                  References Cited

U.S. PATENT DOCUMENTS

| | | | |
|---|---|---|---|
| 2003/0007378 A1* | 1/2003 | Regev | G11C 15/04 |
| | | | 365/49.17 |
| 2005/0050352 A1 | 3/2005 | Narayanaswami et al. | |
| 2005/0083949 A1* | 4/2005 | Dobbins | H04L 12/467 |
| | | | 370/395.53 |
| 2005/0117525 A1* | 6/2005 | Poustchi | H04L 61/5046 |
| | | | 370/254 |
| 2006/0120317 A1 | 6/2006 | Zheng | |
| 2009/0279521 A1* | 11/2009 | Ikeda | H04L 45/42 |
| | | | 370/338 |
| 2012/0213211 A1 | 8/2012 | Remaker | |
| 2013/0067104 A1* | 3/2013 | Zhang | H04L 65/1016 |
| | | | 709/228 |
| 2013/0201978 A1 | 8/2013 | Iyer et al. | |
| 2014/0029495 A1 | 1/2014 | Ise | |
| 2014/0089491 A1 | 3/2014 | Nadler et al. | |
| 2016/0135041 A1 | 5/2016 | Lee et al. | |
| 2016/0135053 A1 | 5/2016 | Lee et al. | |
| 2016/0302058 A1 | 10/2016 | Mestanov et al. | |
| 2016/0344681 A1 | 11/2016 | Lambert et al. | |
| 2017/0171737 A1 | 6/2017 | Mestanov et al. | |
| 2017/0201930 A1 | 7/2017 | Chen et al. | |
| 2020/0169872 A1 | 5/2020 | Hooda et al. | |
| 2020/0351648 A1 | 11/2020 | Fang | |
| 2021/0209218 A1* | 7/2021 | Watson | H04W 12/06 |
| 2022/0200950 A1 | 6/2022 | Sekar et al. | |

* cited by examiner

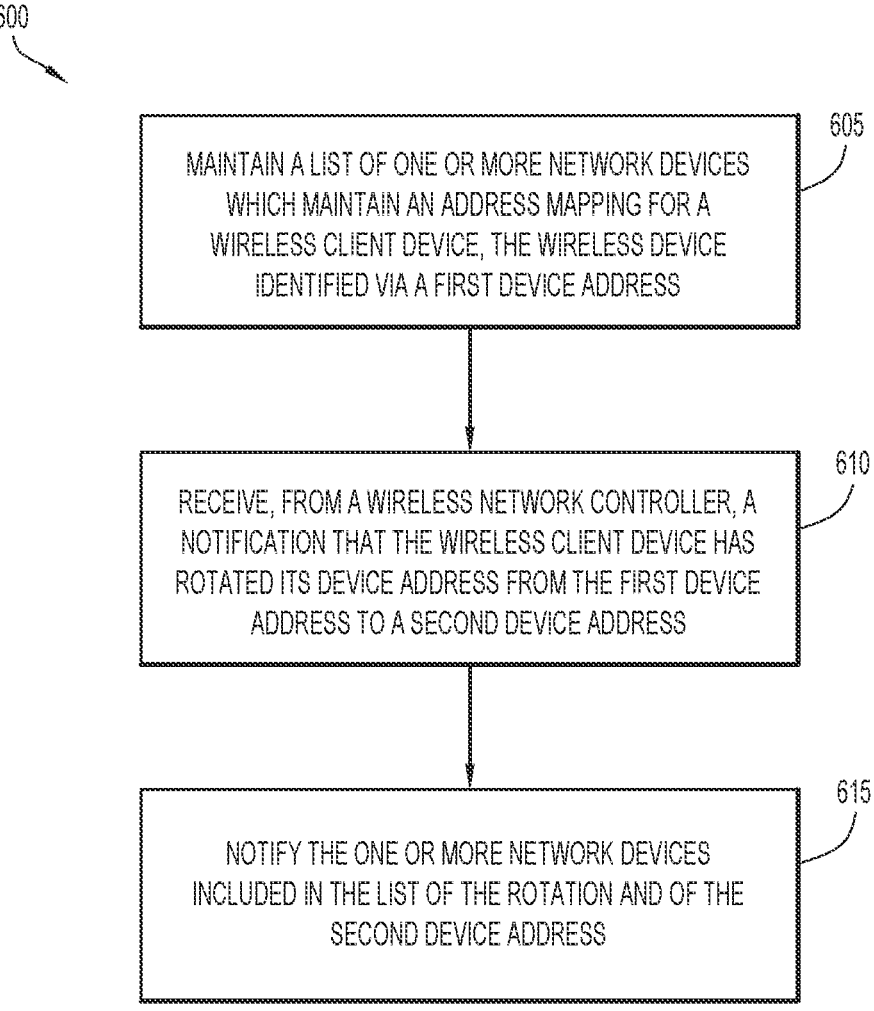

600

605
MAINTAIN A LIST OF ONE OR MORE NETWORK DEVICES WHICH MAINTAIN AN ADDRESS MAPPING FOR A WIRELESS CLIENT DEVICE, THE WIRELESS DEVICE IDENTIFIED VIA A FIRST DEVICE ADDRESS

610
RECEIVE, FROM A WIRELESS NETWORK CONTROLLER, A NOTIFICATION THAT THE WIRELESS CLIENT DEVICE HAS ROTATED ITS DEVICE ADDRESS FROM THE FIRST DEVICE ADDRESS TO A SECOND DEVICE ADDRESS

615
NOTIFY THE ONE OR MORE NETWORK DEVICES INCLUDED IN THE LIST OF THE ROTATION AND OF THE SECOND DEVICE ADDRESS

MAINTAIN AN ADDRESS MAPPING OF A VLAN OR
PARTICULAR DEVICE ADDRESS
705

PROVIDE INDICATION OF ADDRESS MAPPING TO A
NETWORK CONTROLLER
710

RECEIVE A NOTIFICATION THAT THE ADDRESS MAPPING
IS UPDATED
715

UPDATE THE MAPPING BASED ON THE RECEIVED UPDATE
720

ROUTE A PACKET BASED ON THE UPDATED MAPPING
730

800

805

RECEIVE A NOTIFICATION OF AN ADDRESS ROTATION

810

TRANSMIT AN ADDRESS CHANGE MESSSAGE TO A
NETWORK CONTROLLER

PROACTIVE NOTIFICATION OF WIRELESS CLIENT ADDRESS ROTATION

CROSS-REFERENCE TO RELATED APPLICATIONS

This application is a continuation of U.S. patent application Ser. No. 17/976,124, filed Oct. 28, 2022, now U.S. Pat. No. 12,041,694, issued Jul. 16, 2024, which is a continuation of U.S. patent application Ser. No. 17/329,819, filed May 25, 2021, now U.S. Pat. No. 11,540,116, issued Dec. 27, 2022, the entire contents of which are incorporated herein by reference.

TECHNICAL FIELD

The present disclosure relates to secure wireless networking.

BACKGROUND

In an effort to improve privacy of a mobile device user, many mobile operating system vendors are periodically changing (or "rotating") a device address (e.g. a station address) used to identify a mobile device on a wireless network. By changing the device address, it can be more difficult for an eavesdropper to not only track a location of a mobile device user, but also, in some circumstances, monitor their online activities. While rotation of a wireless device's address can improve privacy, much of the legacy wireless network infrastructure was not designed to accommodate such address rotation, and in many cases, uses the device address as an identifier of the wireless device for a variety of processing.

BRIEF DESCRIPTION OF THE DRAWINGS

FIG. 6 is a flowchart of a method for updating an address mapping in a network in response to a rotation of a wireless client device address rotation, according to an example embodiment.

DESCRIPTION OF EXAMPLE EMBODIMENTS

Overview

Figure 1:
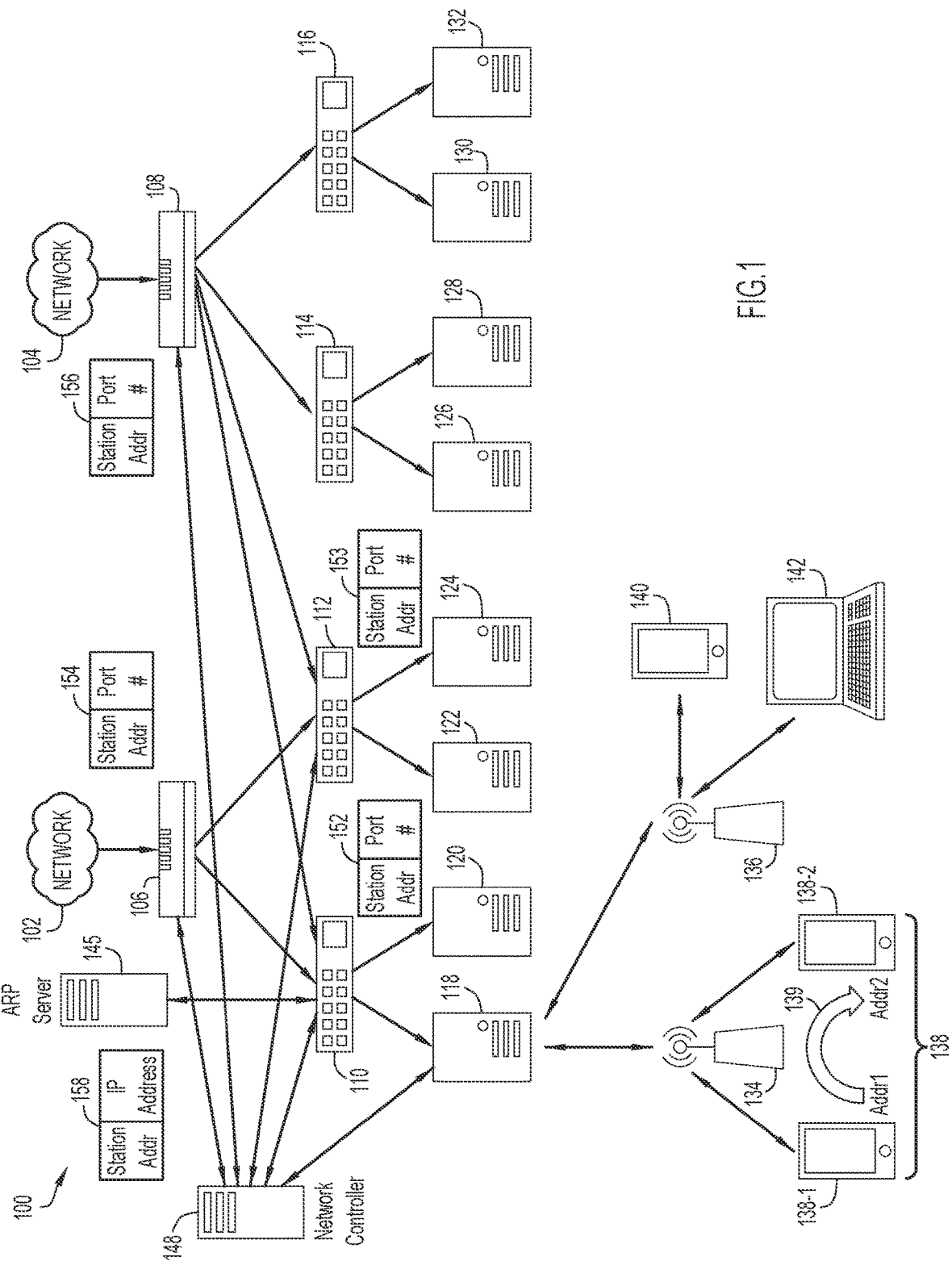
FIG. 1 is an overview of a network configured to perform and propagate notification of wireless client address rotation, according to an example embodiment.

One aspect disclosed herein is a method performed by a network controller device. The method provides for proactive notification of a device address rotation by a wireless client device when layer two and/or layer three devices maintain a mapping of the device address. The method includes maintaining a list of one or more network devices which store an address mapping for a wireless client device, the wireless client device identified via a first device address, receiving, from a wireless network controller, a notification that the wireless client device has rotated its device address from the first device address to a second device address, and notifying the one or more network devices included in the list of the rotation and of the second device address.

Example Embodiments

In a modern wireless network, wireless devices may rotate their device addresses at any time. In some cases, the device address is rotated on an aperiodic and/or relatively frequent basis. In some cases, a wireless device is prompted by network infrastructure to perform an address rotation. Alternatively, a wireless device initiates the rotation independent of any other device. Some devices rotate upon satisfaction of one or more pre-established criteria. On a relatively large network that supports a relatively large number of wireless clients, the large number of rotations occurring as each wireless client rotates its address can result in a variety of undesired effects to network infrastructure.

In some cases, a wireless client maintains an existing Internet Protocol (IP) address assignment through a device address rotation. Thus, use of the IP address by the device continues, albeit in association with a different (new) Media Access Control (MAC) address. In contrast to the stability of IP addresses during rotation, each time a device address is rotated, upstream layer 2 (L2) switches on the same associated virtual local area network (VLAN) will need to refresh their content addressable memory (CAM) information (e.g., tables). A traditional update of CAM information is accomplished via a process known as MAC learning. In MAC learning, a switch that identifies a previously unknown MAC address floods ports of network devices on a VLAN until a device identified via the new device address responds.

Along with the updating of L2 switch, any upstream gateway router that stores address resolution protocol (ARP) entries needs to be updated to reflect the new device address. Typical ARP protocol operation includes the broadcasting of ARP queries. The ARP query provides an IP address and requests a corresponding device address. In a network environment that includes frequent address rotation by a relatively large number of wireless devices, these ARP broadcasts can have a deleterious effect on network infrastructure. Thus, implementation of device address rotation on large networks introduces an unpredictable (and unnecessary) amount of L2 flooding and MAC learning, resulting in broadcast storms that could potentially cripple the infrastructure via broadcast storms and control plane exhaustion.

As discussed above, MAC leaning and ARP discovery via flooding is a design feature of a network L2 control plane mechanism. However, L2 control plane protocols were not designed with a high volume of rapidly rotating MAC addresses in mind. Even in existing networks that do not implement address rotation, network flaps (due to network instability) can have detrimental effects on L2 control plane functions such as MAC learning and ARP. For example, in existing stable networks with a large number of clients, the ARP traffic alone (which is broadcast traffic) can often become a challenge for network engineers.

This effect can be multiplied when device address rotations are implemented. Thus, a method to automatically update and synchronize the L2 control plane (the ARP and CAM entries) in a programmable way has become highly desirable.

Presented herein are embodiments that provide fast aging and flushing of CAM and ARP mapping data. The disclosed embodiments also include the use of mobile announce messages to implement a relatively fast address rotation update for network infrastructure. To accomplish these objectives, the network infrastructure provides a method of detecting when a wireless client device rotates its device address. In some embodiments, these methods are collaborative, with the wireless client device and an access point exchanging one or more messages to coordinate the rotation. In other embodiments, the access point detects the address rotation using one or more heuristics, without explicit notification from the wireless client device. Regardless of the approach used, the wireless infrastructure is able to maintain an identification of a particular device, and accurately associate one or more device addresses with that particular device. The detection of address rotation and identification of a particular wireless client through the address rotation is performed by one or more network infrastructure devices working alone or in coordination with each other. These devices can include one or more of a wireless network controller, an access point, an authentication, authorization, and accounting (AAA) service, a dynamic host control protocol (DHCP) server, or other network infrastructure.

Upon detecting a device rotation or change, a network controller is notified. In some cases, the network controller controls a software defined network (SDN) controller. In some embodiments, the notification is accomplished by invoking a notification of an application programming interface (API) provided by the network controller. The notification includes one or more of a previous device address of a wireless device, a new device address of the wireless device, an IP address of the device, and a VLAN of which the device is a member.

The network controller maintains a list of network devices associated with a wireless L2 domain and a VLAN. An inventory is made of such network devices and the list is stored in a data store. The inventory includes L2 switches that share the same VLAN/broadcast domain of the wireless device, along with any routers that may carry ARP entries for clients in the wireless local area network (WLAN), or any service that may have a dependency on the device address (e.g., management software using a device address as a key, Dynamic Host Configuration Protocol (DHCP) services, etc.). Thus the network controller maintains a list of device address dependent services/systems on a per VLAN basis. This list of network devices is then consulted when a wireless client rotates its device address.

Upon receiving notification of an address rotation, the network controller searches the list to determine which network devices are participating in the VLAN affected by the rotation. The network controller then notifies (e.g., via an Application Programming Interface (API) call) each identified device (e.g., some embodiments may utilize a network management protocol, such as the Network Configuration Protocol (Netconf). The notification instructs the network device to replace an existing mapping containing the old device address with the new device address. This process effectively implements an accelerated decay of the address mapping (e.g., the previous device address is immediately aged out and flushed, while the new device is inserted in the mapping for the associated switch port). If the previous device address was not present in the mapping, the notification has no effect on the switch. Generally, the network device will include a mapping corresponding to the previous device address, since the notification is provided to devices identified via MAC learning of the previous device address. This process is also performed on other systems (e.g. management platforms), although each system may have a different method of notification, and/or response behavior (flushing the previous device address, mapping it to the new device address, or other).

In some embodiments, the network controller also evaluates which network devices maintain an IP address to device address mapping on the affected VLAN (e.g. L3 boundary routers of the affected VLAN). The network controller notifies (e.g., via an API call) these routers and instructs them to update their mapping for the previous device address+IP binding. In some circumstances, a device maintains both a L2 mapping and a L3 mapping for the device address. Thus, in this case, the network controller immediately ages out and caused the mapping of previous device address to IP address to be flushed, then stores a new mapping between the new device address and the IP address. Some embodiments maintain a mapping and/or history between the previous device address and the new device address. By proactively updating the L2 and L3 mappings associated with the previous device address, the need for the flooding and broadcast address discovery approaches described above is reduced or eliminated, resulting in improved network performance.

FIG. 1 is an overview of a network implementing an example embodiment. The network 100 interfaces with two external networks, labeled as network 102 and network 104. A router 106 and a router 108 provide interfaces to each of the network 102 and network 104, respectively. The router 106 routes traffic between two switches, switch 110 and switch 112, and the network 102. The router 108 routes traffic between two switches, switch 114 and 116, and the network 104.

The switch 110 is in communication with a wireless network controller 118 and wireless network controller 120. The switch 112 is in communication a wireless network controller 122 and a wireless network controller 124. The switch 114 is in communication with a wireless network controller 126 and a wireless network controller 128. The switch 116 is in communication with a wireless network controller 130 and a wireless network controller 132.

FIG. 1 shows that the wireless network controller 118 is in communication with two access points, access point 134 and access point 136. The access point 134 is in communication with a wireless device 138. The wireless device 138 is shown in FIG. 1 in two forms. The wireless device 138-1 is the wireless device 138 with a first device address. The wireless device 138-2 also represents the wireless device 138, except that wireless device 138-2 is identified via a different device address than that used by the wireless device 138-1. Thus, the wireless device 138-2 represents the wireless device 138-1 after a device address rotation, shown as rotation 139. The access point 136 is in communication with a wireless device 140 and a wireless device 142. While each of the wireless network controllers 120, 122, 124, 126, 128, 130, and 132 are not shown communicating with access points, this is to preserve figure clarity, and the disclosed embodiments operate in a manner such that each of these wireless network controllers may each be in communication with one or more APs and/or wireless devices.

FIG. 1 also illustrates an ARP server 145. The ARP server 145 provides resolution of IP addresses to device addresses in the network 100.

In the network of FIG. 1, one or more of the wireless network controller 118, switch 110, router 106, and/or router 108 provide network communication between the wireless device 138 and the network 102 and/or network 104. As discussed above, an address rotation by the wireless device 138 presents challenges to these network devices in maintaining communication of traffic on behalf of the wireless device 138. To illustrate the potential challenges presented by an address rotation, FIG. 1 shows that the switch 110 maintains or stores a mapping information 152 of device addresses to switch port numbers. The switch 112 maintains or stores a mapping information 154 of device addresses to switch port numbers. The mapping information 152 and mapping information 153 each indicate to the respective switch, upon receiving a packet having a particular device address, a port of the respective switch to which the packet should be forwarded. In other words, the mapping information 152 indicates a network path to the device identified by a particular device address. Upon a rotation of a device address of the wireless device 138, the mapping information 152 for the wireless device 138 will no longer be valid, resulting in the switch 110 being unable to identify a location of the wireless device 138 if it receives a packet addressed to the wireless device 138. As discussed above, traditional methods of resolving this challenge include a process known as MAC learning, which includes the switch 110 communicating, and in some cases, broadcasting messages on a plurality of ports in order to locate the wireless device 138. For example, during MAC learning, the switch 110 might broadcast a message to both the wireless network controller 118 and the wireless network controller 120 in an effort to re-identify a location of the wireless device 138 after it rotates its device address from the address represented by wireless device 138-1 to the device represented by the wireless device 138-2.

Other network devices also store address information of the wireless device 138. For example, FIG. 1 shows that the router 106 stores the mapping information 154 and the router 108 stores the mapping information 156. Both the mapping information 154 and/or the mapping information 156 store, in certain circumstances, mapping information including a device address of the wireless device 138. Thus, when the wireless device rotates its device address from the address represented by the wireless device 138-1 to the address represented by the wireless device 138-2, each of the mapping information 154 and the mapping information 156 include invalid mapping entries of the wireless device 138.

The ARP server 145 also maintains/stores mapping information 158 of device addresses to IP addresses. Thus, when the wireless device 138 rotates its device address any entries in the mapping information 158 that identify the wireless device 138 via a previous device address will be obsolete, and thus not function to provide routing information for the wireless device 138.

To provide for more proactive updating of the mapping described above in the event of an address rotation, the disclosed embodiments provide a network controller 148 configured to perform operations as explained below. Upon detecting that the wireless device 138 has rotated its device address, the wireless network controller 118 notifies the network controller 148 of that rotation. The network controller 148 maintains a list of network devices that store mapping information regarding the wireless device 138. In response to receiving the notification, the network controller 148 notifies one or more network devices in the list, indicating the new device address for the wireless device 138. Thus, as one example, upon the wireless device 138 rotating its device address, the wireless network controller 118 sends a message to the network controller 148. The message indicates the previous device address (e.g. an address used by the device represented by the wireless device 138-1), and the new device address (e.g., an address used by the device represented by the wireless device 138-2). The notification also includes, in some embodiments, a VLAN identifier associated with the VLAN of which the wireless device 138 is a member. The network controller 148 then searches its maintained list to identify network devices either associated with the particular VLAN and/or maintaining mapping information of the wireless device 138, and notifies each of those network devices of the address rotation. Each of the mappings, e.g., mapping information 152, mapping information 154, and mapping information 156 are then updated by those network devices which maintain the respective mappings upon receiving the notifications. In some embodiments, the network controller 148 also maintains a list of network devices that maintain a device address to IP address mapping of the wireless device 138 (e.g. such as the ARP server 145). Thus, upon receiving the notification from the wireless network controller 118, the network controller 148 also notifies the ARP server 145. Upon receiving the notification, the ARP server 145 updates the mapping information 158 to the new device address of the wireless device 138.

By proactively updating these mappings, such as one or more of the mapping information 152, mapping information 154, mapping information 156, and/or mapping information 158, the network 100 is able to more efficiently adapt to an address rotation of the wireless device 138. When larger numbers of wireless client devices are performing address rotations on a periodic or otherwise relatively frequent basis, this proactive updating of mappings can substantially improve operation of the network 100.

Figure 2:
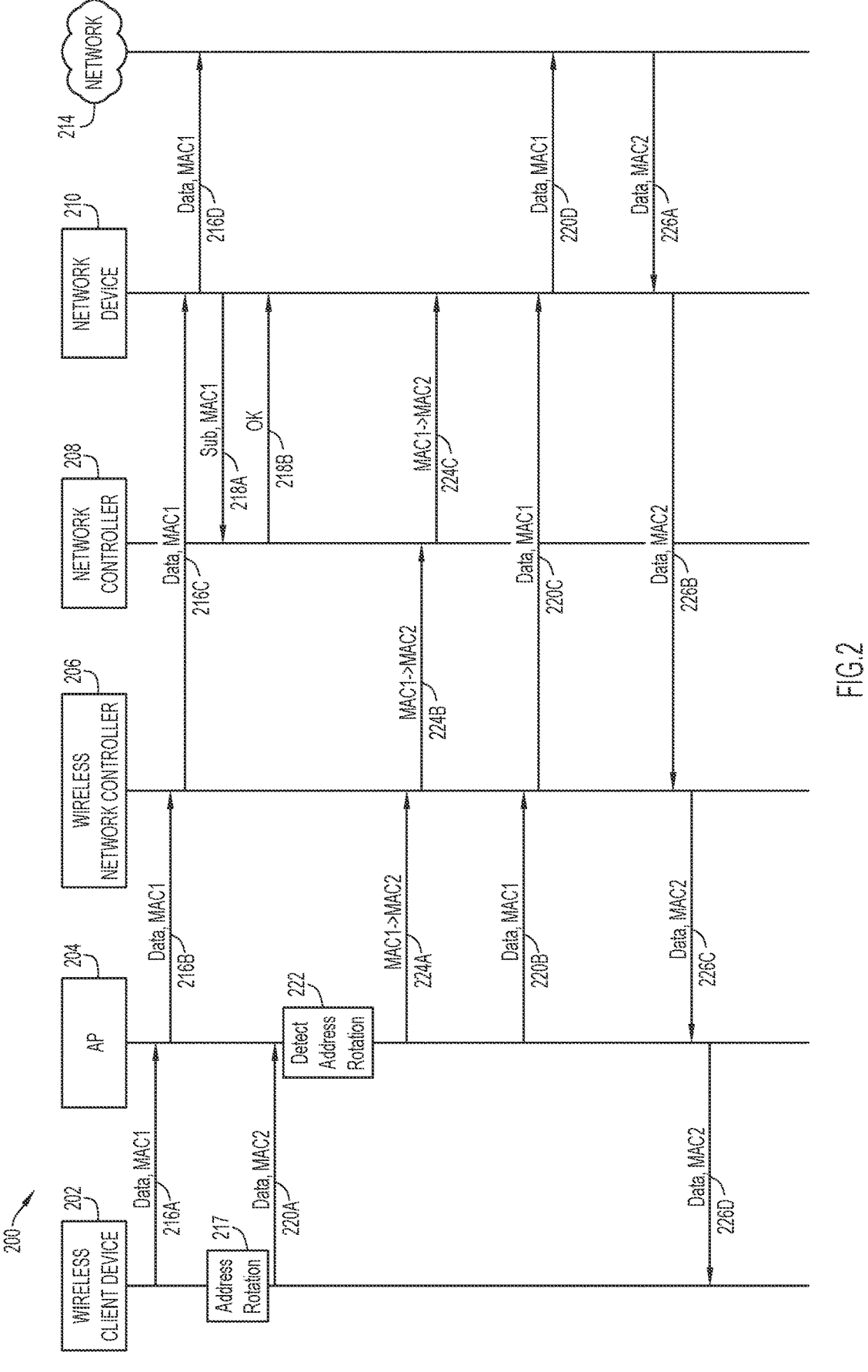
FIG. 2 is a sequence diagram showing messages exchanged between network devices as part of a publish/subscribe scheme between a network controller and layer 2 (L2) or layer 3 (L3) devices, in accordance with an example embodiment.

FIG. 2 is a sequence diagram 200 showing messages exchanged between a wireless client device 202, AP 204, wireless network controller 206, a network controller 208, a network device 210, and a network 214, the illustrated exchange being in accordance with an example embodiment. In the sequence diagram 200 of FIG. 2, the messages exchanged illustrate a publish/subscribe scheme between the network controller 208 and one or more network devices (e.g. network device 210) that maintain address mappings of the wireless client device 202.

FIG. 2 shows the wireless client device 202 transmitting data over the network 214 using a first device address, denoted as "MAC1" in FIG. 2. Thus, to transmit data over the network 214, the wireless client device 202 sends a data message 216A to the AP 204. The data message 216A identifies the wireless client device 202 via a first device address (e.g. "MAC1"). The first device address is indicated as a source address in the data message 216A, at least in some embodiments. In response to receiving the data message 216A, the AP 204 sends a corresponding data message 216B to the wireless network controller 206. The wireless network controller 206, in response to receiving the data message 216B, sends a corresponding data message 216C to the network device 210 (e.g. a switch or a router). The network device 210 then forwards a data message 216D onto the network 214. Each of the data messages 216A-D identify the wireless client device 202 via the first device address.

FIG. 2 then illustrates the network device 210 sending a subscription message 218A to the network controller 208. The subscription message 218A requests that the network device 210 be notified of any changes to the first device address of the wireless client device 202. In some embodiments, the subscription message 218A is generated by the network device 210 in response to the network device 210 receiving the data message 216C from the wireless network controller 206, as the data message 216C identified the wireless client device 202 via the first device address (e.g., "MAC1"). The network controller 208 acknowledges the subscription message 218A via an acknowledgement message 218B.

FIG. 2 then shows the wireless client device rotating its device address in block 217. The wireless client device 202 then sends a data message 220A, and identifies itself in the data message 220A via the new, second device address (e.g. "MAC2"). In response to receiving the data message 220A, the AP 204 detects that the wireless client device 202 has rotated its device address in block 222. There are a variety of methods the AP 204 can utilize to detect the address rotation. For example, in some embodiments, the AP 204 and wireless client device 202 exchange messages (not shown) coordinating the address rotation. Other approaches include the AP 204 identifying the wireless client device 202 based on a behavior signature of the wireless client device 202. Upon detecting the address rotation, the AP 204 sends an address update message 224A to the wireless network controller 206. The address update message 224A indicates that the wireless client device 202 has updated its device address from the first device address (e.g. "MAC1") to the second device address (e.g., "MAC2"). In response to receiving the address update message 224A, the wireless network controller 206 transmits an address update message 224B to the network controller 208. Upon receiving the address update message 224B from the wireless network controller 206, the network controller 208 searches a list of devices that maintain mapping information of the wireless client device 202. In the publish/subscribe embodiment illustrated by FIG. 2, the list of devices includes network devices that have subscribed to address updates of the wireless client device 202. In some embodiments, the subscription(s) are for any updates to the first device address (e.g., MAC1). Thus, the network controller 208 identifies that the network device 210 is to be notified of any updates of the wireless client device 202 (or the first device address), and thus, sends an address update message 224C to the network device 210. Note that the network controller 208 may transmit, in at least some embodiments, multiple address updates messages to multiple network devices in response to receiving the address update message 224B. However, for ease of illustration, only one network device is illustrated in FIG. 2. Upon receiving the address update message 224C from the network controller 208, the network device 210 replaces any mapping entries maintained by the network device 210 that reference the first device address (e.g., "MAC1") to instead reference the second device address (e.g., "MAC2").

FIG. 2 also shows the AP 204 forwarding the data message 220A, which identifies the wireless client device 202 via the second device address, to the wireless network controller 206 as message 220B. Upon receiving the message 220B, the wireless network controller 206 forwards the data message to the network device 210 as data message 220C. The network device 210 then forwards the data message 220C to the network 214 as data message 220D.

FIG. 2 further illustrates the network device 210 receiving a data message 226A from the network 214. The data message 226A indicates the second device address (e.g., "MAC2") as a destination address of the data message 226A. Because the network device 210 has an updated mapping that now references the second device address, as provided by the address update message 224C, the network device 210 is able to identify a network path upon which to route the data message 226A to the wireless client device 202. Thus, the network device 210 forwards the data message 226A as data message 226B to the wireless network controller 206. The wireless network controller 206 forwards the data message 226B to the AP 204 as data message 226C. The AP 204 delivers the data as data message 226D to the wireless client device 202.

Figure 3:
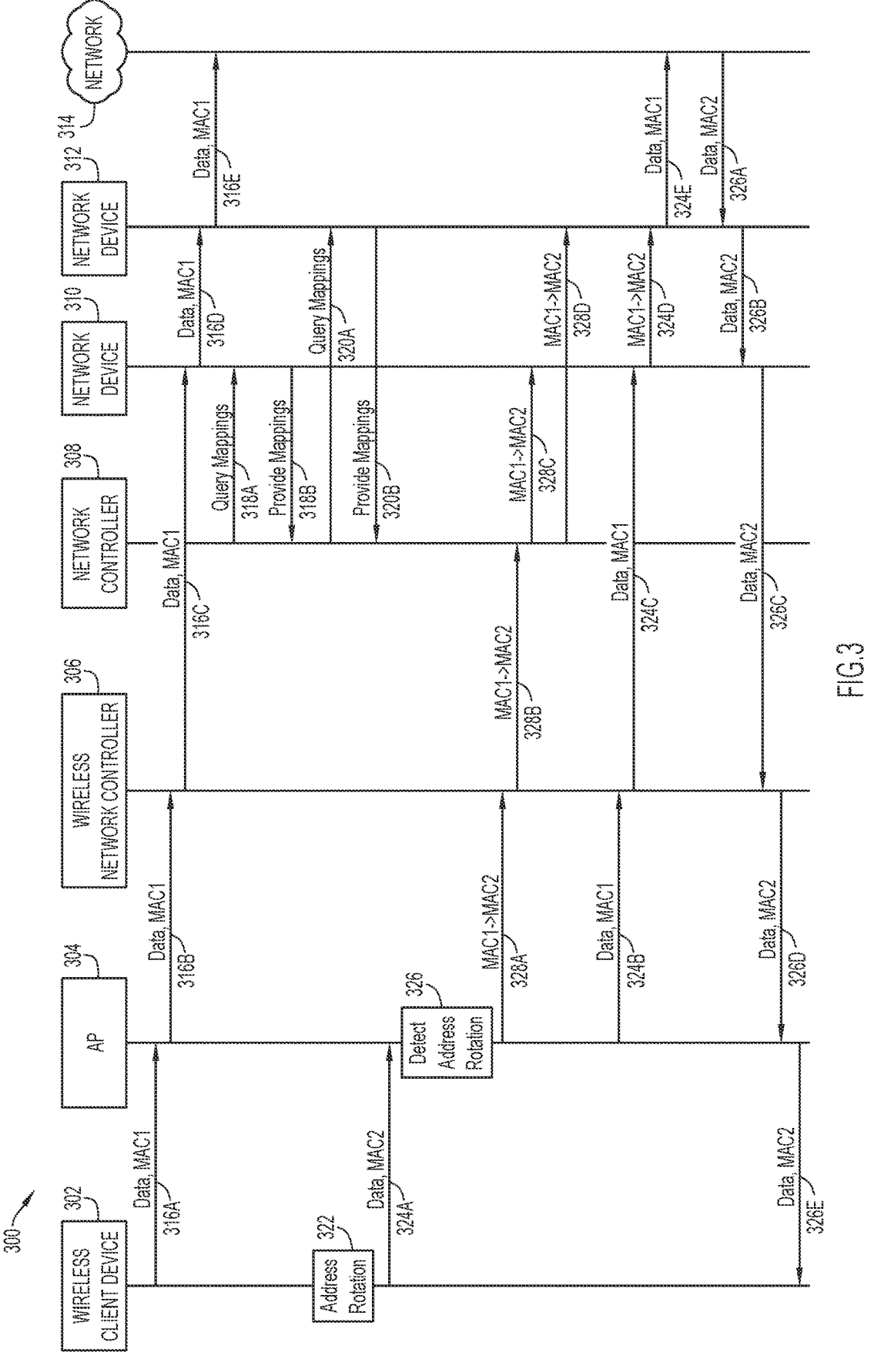
FIG. 3 is a sequence diagram showing messages exchanged between network devices in accordance with an example embodiment.

FIG. 3 is a sequence diagram 300 showing messages exchanged between a wireless client device 302, AP 304, wireless network controller 306, a network controller 308, a first network device 310 (e.g. a switch), a second network device (e.g., a router or an ARP service) and a network 314. The illustrated exchange is in accordance with an example embodiment. The sequence diagram 300 of FIG. 3 illustrates an embodiment in which the network controller 308 actively queries one or more network devices to obtain their address mappings. By retrieving mappings stored by the network devices, the network controller 308 is able to maintain a list of such mappings. The list is then used to determine which network devices to notify when a wireless client device 302 rotates its device address.

FIG. 3 shows the wireless client device 302 transmitting data over the network 314 using a first device address, denoted as "MAC1" in FIG. 3. Thus, to transmit data over the network 314, the wireless client device 302 sends a data message 316A to the AP 304. The data message 316A identifies the wireless client device 302 via a first device address (e.g. "MAC1"). In response to receiving the data message 316A, the AP 304 sends a corresponding data message 316B to the wireless network controller 306. The wireless network controller 306, upon receiving the data message 316B, sends a corresponding data message 316C to the first network device 310 (e.g. a switch or a router). The first network device 310 then forwards a data message 316D to the second network device 312. In response to receiving the data message 316D, the second network device 312 then forwards the data message 316E onto the network 314. Each of the data messages 316A-D identify the wireless client device 302 via the first device address.

FIG. 3 also shows the network controller 308 querying each of the first network device 310 and the second network device 312 via query messages 318A and 320A respectively. In some embodiments, the querying of the first network device 310 and the second network device 312 is accomplished using the Netconf network management protocol, for example. Netconf provides a command interface that is implemented by many network devices, and facilitates extraction of address mapping information from the network devices. Other embodiments utilize a different mechanism to obtain the address mapping information. For example, some embodiments of the network controller 308 invoke proprietary application programming interfaces implemented by one or more of the first network device 310 or the second network device 312.

Each of the first network device 310 and the second network device 312 respond to the queries via response messages 318B and 320B, respectively. The response messages 318B and 320B indicate one or more mapping entries stored by the first network device 310 or second network device 312, respectively. The network controller 308 utilizes information included in the response messages 318B and 320B to build or maintain a list of devices that are to be notified when client device addresses utilized on a network are rotated or otherwise modified.

FIG. 3 then shows the wireless client device 302 rotating its device address in block 322. The wireless client device 302 then sends a data message 324A to the AP 304, and identifies itself in the data message 324A using a new device address (e.g., "MAC2"). For example, the new device address is indicated, in some embodiments, in a source address field of the data message 324A. Upon receiving the data message 324A, the AP 304 detects that the wireless client device 302 has rotated its device address in block 326. As discussed above with respect to FIG. 2, the detection of address rotation by the AP 304 can occur based on a variety of methods, including explicit coordination between the wireless client device 302 and the AP 304 on the address rotation, a signature based method, or other methods.

In response to detecting the address rotation in block 326, the AP 304 sends an address change message 328A to the wireless network controller 306. In response to receiving the address change message 328A, the wireless network controller 306 sends a corresponding address change message 328B to the network controller 308. The address change message 328A and the address change message 328B indicate equivalent values for one or more fields, such as fields indicating a previous device address used by the wireless client device 302, the new device address used by the wireless client device 302, a VLAN identifier of a VLAN to which the wireless client device 302 participates, or other information. Upon receiving the address change message 328B, the network controller 308 searches its list of devices that maintain address mappings for the wireless client device 302 (e.g., the first device address). The list is generated, at least in part, based on the response messages 318B and 320B discussed above. By searching the list, the network controller 308 determines that the first network device 310 and the second network device 312 are to be notified of the address rotation of the wireless client device 302.

In response to this determination, the network controller 308 then sends address change message 328C and address change message 328D to the first network device 310 and second network device 312 respectively. Upon receiving the address change messages 328C and 328D, the first network device 310 and second network device 312 update their mappings to replace the first device address (e.g. "MAC1") with the new second device address (e.g. "MAC2").

FIG. 3 also illustrates the AP 304 forwarding the data message 324A as data message 324B to the wireless network controller 306. Upon receiving the data message 324B from the AP 304, the wireless network controller 306 forwards the data message 324B as data message 324C to the first network device 310. The first network device 310 forwards the data message 324C as data message 324D to the second network device 312. The second network device 312 forwards the data message 324D as data message 324E to the network 314.

FIG. 3 further illustrates the network 314 providing an inbound data message 326A to the second network device 312. The inbound data message 326A specifies the new second device address as a destination address for the inbound data message 326A. Because the second network device 312 was updated via the address change message 328D, the second network device 312 is able to identify a network path (e.g. a port number) upon which to route the inbound data message 326A to the wireless client device 302. Thus, the second network device 312 forwards the inbound data message 326A as data message 326B to the first network device 310. Similar to the second network device 312, because the first network device 310 received an address change message 328C indicating the wireless client device 302 had rotated its device address from the first device address to the second device address, the first network device 310 is able to consult its updated mapping table and identify a network path upon which to route the data message 326B. As a result, the first network device 310 forwards the data message 326B as data message 326C to the wireless network controller 306. The wireless network controller 306 forwards the data message 326C to the AP 304 as data message 326D. The AP 304 forwards the data message 326D to the wireless client device 302 as data message 326E.

Figure 4B:
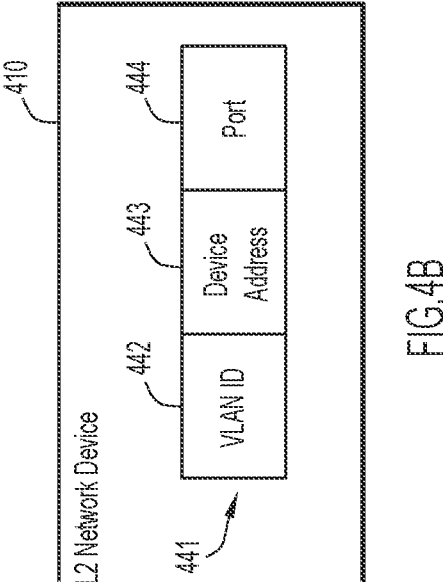
FIG. 4B illustrates mapping information maintained by a L2 network device in accordance with an example embodiment.
Figure 4C:
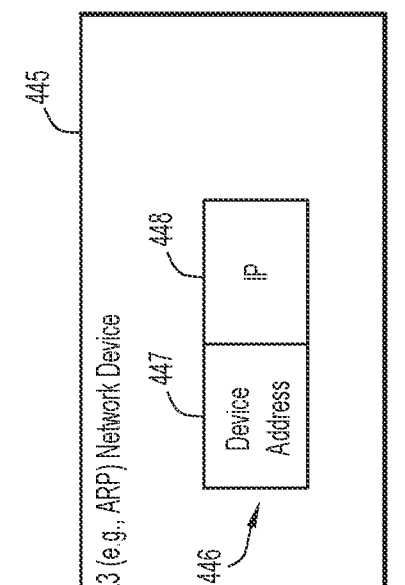
FIG. 4C shows mapping information maintained by a L3 device in accordance with an example embodiment.
Figure 4A:
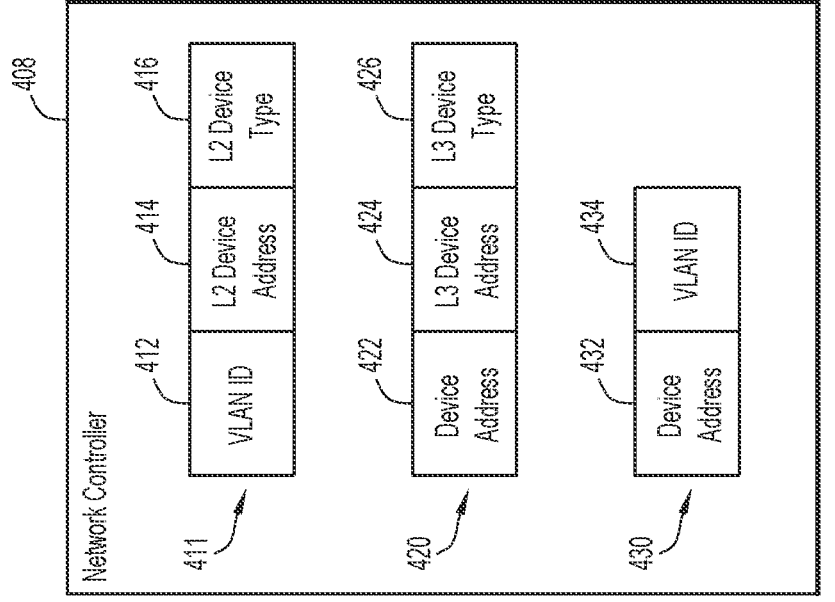
FIG. 4A shows an example list of device information maintained by a network controller in accordance with an example embodiment.

FIG. 4A shows an example list of device information maintained by a network controller in accordance with an example embodiment. As illustrated above with respect to FIG. 2 and FIG. 3, some embodiments provide a network controller that maintains a list of network devices that are maintaining mapping information for one or more particular wireless client devices. While the example data structures of FIG. 4A are discussed as relational database tables, other embodiments utilize other data architectures, and these examples are not intended to be limiting. Note that the description of the relational database tables discusses a single row of each table, but one of skill would understand the tables may include multiple rows as necessary to store data.

FIG. 4A shows that a network controller 408 includes a L2 device mapping information 411, a L3 device mapping information 420, and a wireless client device table 430. The L2 device mapping information 411 includes a VLAN identifier field 412, a L2 device address field 414, and a L2 device type field 416. The VLAN identifier field 412 identifies a particular VLAN. The L2 device address field 414 identifies a device address that provides communication services for the VLAN that is identified via the VLAN identifier field 412. For example, in some embodiments, the L2 device address field 414 stores addresses of the router 106, router 108, switch 110, switch 112, switch 114, or switch 116. The L2 device type field 416 indicates a type of the device (e.g. router or switch). In some embodiments, how a network controller interfaces with an L2 device varies based on the type of device (e.g., some device APIs vary by device type).

The L3 device mapping information 420 includes a device address field 422, a L3 device address field 424, and a L3 device type field 426. The device address field 422 defines a device address of a wireless client device. The L3 device address field 424 indicates an address of a L3 device that maintains L3 mapping information relating to the wireless client device identified via the device address field 422. The L3 device type field 426 defines a type of the L3 device, as interface techniques between the network controller and the L3 device may vary based on the type of the L3 device.

The wireless client device table 430 includes a device address field 432 and a VLAN identifier field 434. The wireless client device table 430 identifies VLAN membership of wireless client devices. The device address field 432 stores a device address of a wireless client device. The VLAN identifier field 434 stores a VLAN of which the wireless client device is a member.

FIG. 4B illustrates a L2 network device 410 in accordance with an example embodiment. FIG. 4B shows the L2 network device 410 stores L2 mapping information 441 that includes a VLAN identifier field 442, a device address field 443, and a port field 444. The VLAN identifier field 442 stores a VLAN with traffic that is serviced by the L2 network device 410. The device address field 443 stores a device address of a wireless client device. The port field 444 indicates a port of the L2 network device 410 over which the device identified by the device address field 443 is reachable.

FIG. 4C shows mapping information maintained by a L3 device 445 in accordance with an example embodiment. The L3 device 445 includes an L3 mapping information 446 that includes a device address field 447 and an IP address field 448. The device address field 447 stores a device address of a wireless client device. The IP address field 448 stores an IP address assigned to the wireless client device. As discussed above, in some embodiments, the L3 device 445 receives an address change message and updates the address stored in the device address field 447 based on address information included in the address change message.

Figure 5:
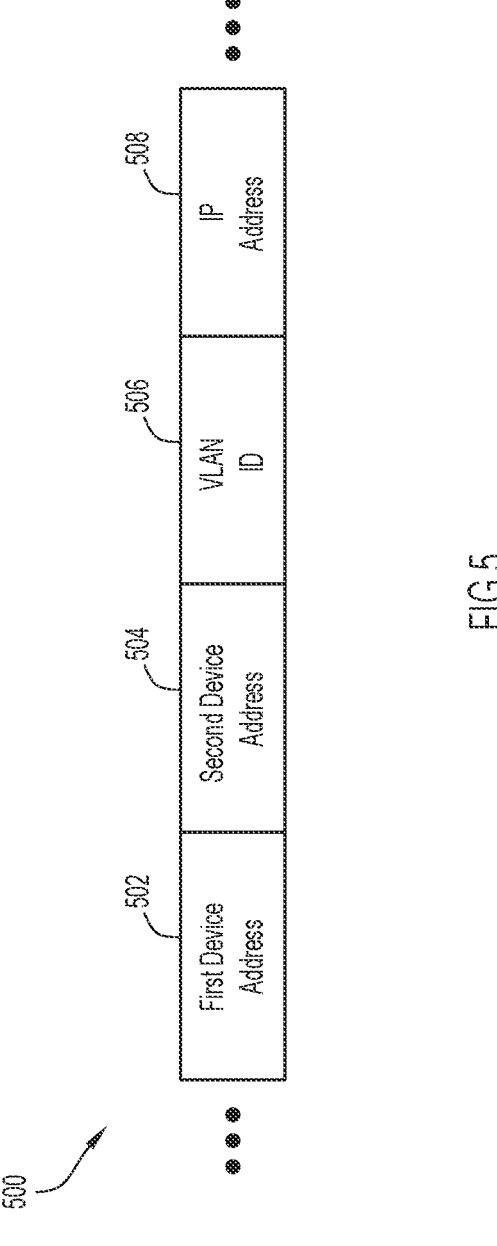
FIG. 5 illustrates an address change message in accordance with an example embodiment.

FIG. 5 illustrates an address change message 500 in accordance with an example embodiment. Various embodiments of an address change message discussed in this disclosure may include one or more of the fields of the address change message 500 discussed with respect to FIG. 5. The address change message 500 includes a first device address field 502, second device address field 504, VLAN identifier field 506, and an IP address field 508. The first device address field 502 indicates a first device address of a device. The second device address field 504 indicates a second device address of a wireless client device. In some embodiments, the first device address and/or second device address are station addresses and/or MAC addresses. In some embodiments, the first device address is used to identify the wireless client device earlier in a device address sequence than the second device address. Thus, in some cases, the second device address represents a "current" device address of the wireless client device, or a most recently identified device address of the wireless client device.

As discussed above, at least some embodiments notify one or more network devices of a wireless client device address rotation. This facilitates more rapid and more efficient adjustments of network infrastructure, and in particular, to mappings cached by network infrastructure devices, such that communication services can be provided to a device that is rotating its device address, while reducing overall impact to the network.

FIG. 6 is a flowchart of a method 600 of updating an address mapping in a network in response to a rotation of a wireless client device address. In some embodiments, the method 600 discussed below with respect to FIG. 6 is performed by a network controller, such as any of the network controller 148, network controller 208, network controller 308, or network controller 408. A device performing the method 600 is referred to below as an "executing device."

In operation 605, a list of one or more network devices is maintained. The network devices maintain/store an address mapping of a wireless client device. The wireless client device is identified via a first device address. In some embodiments, the first device address is a station address (e.g., a MAC address). As discussed above with respect to FIG. 3, some embodiments of a network controller query network devices, such as switches and/or routers, to identify address mappings stored by those devices. In some embodiments, the network devices are queried via a network management protocol, such as Netconf. Netconf provides for a query of a devices address mapping table(s), such as, for example, the L2 mapping information 441 or the L3 mapping information 446. Thus, some embodiments of operation 605 include querying of the one or more network devices to retrieve their mapping information. The mapping information obtained from the one or more network devices is parsed or otherwise decoded when received by the network controller. Information regarding wireless client device addresses that are cached or otherwise stored by the one or more network devices are added to the list maintained by the network controller (e.g., stored in a data structure analogous to the L2 device mapping information 411, L3 device mapping information 420, and/or the wireless client device table 430. Thus, operation 605 retrieves address mapping information from the one or more network devices, and stores information indicating which devices are maintaining mapping information for which wireless client addresses and/or VLANs. These network devices can then be notified as appropriate when an address changes or is rotated.

In some other embodiments, the mapping information is obtained from one or more of the network devices via implementation of a publish/subscribe scheme. With this scheme, one or more of the network devices "subscribe" for network address updates that occur on a particular VLAN or to a particular device address. Thus, an executing device maintains a list of subscribers for updates to each address tracked or managed by the executing device. The list of subscribers is based on subscription requests received from the network devices for particular addresses. Upon receiving notification of a device update (e.g. from an AP or wireless network controller), the subscriber list is consulted and subscribed network devices are notified. In some cases, a L2 or L3 device unsubscribes from updates regarding a particular device address or VLAN. For example, if network activity referencing a particular device address is not seen by a L2 device over a predefined period of elapsed time, the L2 device unsubscribes from updates to that particular device address, at least in some embodiments.

In operation 610, a notification is received from a wireless network controller. The notification indicates that a wireless client device address has changed (e.g., been rotated from a first device address to a new second device address). In some embodiments, the notification received in operation 610 includes one or more of the fields discussed above with respect to address change message 500. In some embodiments, the notification is received from an access point associated with the wireless client device.

In operation 615, one or more network devices are notified of the address change. Thus, operation 615 searches the list maintained by the network controller (e.g. per operation 605) to identify one or more network devices that maintain an address mapping that references the wireless client device. Thus, for example, in some embodiments, devices that participate in network communication over a VLAN indicated in the notification are notified. In some embodiments, one or more network devices that are known to include mapping information for the specific device address that has been changed (e.g., the first device address of the address change message 500) are notified.

As one example of how the operation 615 identifies/determines which network devices to notify, an example embodiment searches the L2 device mapping information 411 to identify those devices indicating a VLAN (e.g. via the VLAN identifier field 412) equivalent to a VLAN identifier indicated in the notification received in operation 610 (e.g. via VLAN identifier field 506). In some embodiments, L3 devices maintaining a mapping for an address (e.g. the first device address field 502 of the address change message 500) are identified via the device address field 422 of the L3 device mapping information 420.

In some embodiments, the notification generated in operation 615 to the one or more devices also includes one or more of the fields discussed above with respect to the example address change message 500. The notification is configured to cause a network device that receives the notification to update a maintained address mapping that references either the first device address or a VLAN in which the wireless client device is participating. The mapping is updated, upon receiving the notification, to instead reference the second device address. In some embodiments, method 600 is performed iteratively or periodically.

Figure 7:
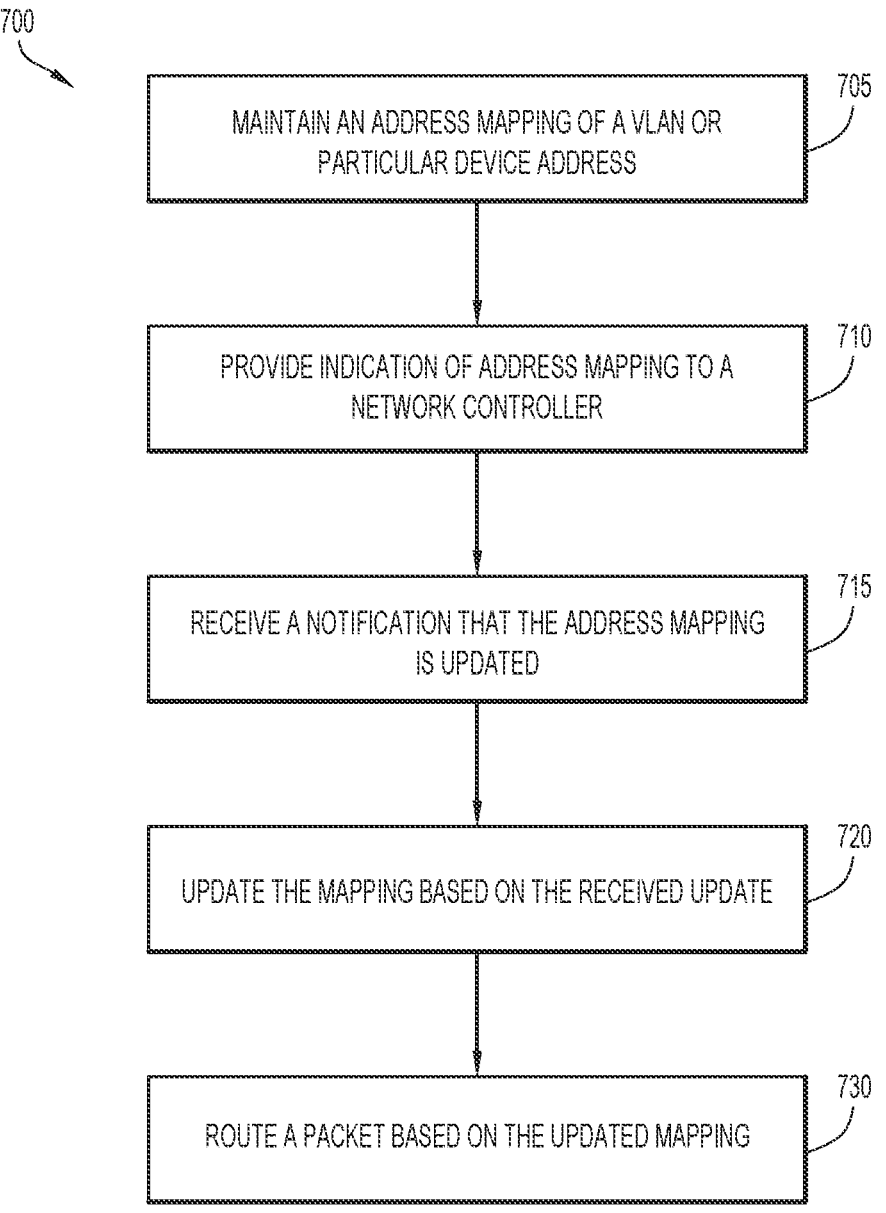
FIG. 7 is a flowchart of a method of receiving a notification of an address rotation in accordance with an example embodiment.

FIG. 7 is a flowchart of a method 700 of updating an address mapping of a wireless client device in accordance with an example embodiment. In some embodiments, the method 700 is performed by a L2 or L3 device, such as one or more of the switch 110, switch 112, switch 114, switch 116, ARP server 145, network device 210, first network device 310, and/or second network device 312. As discussed above, some of the disclosed embodiments improve operation of a network experiencing wireless client device address rotation by proactively notifying L2 and/or L3 devices of an address change, such that address mapping tables can be appropriately updated, without the need for burdensome address discovery processes such as MAC learning and/or ARP broadcasting, as might otherwise be performed using traditional methods.

In operation 705, an address mapping of a VLAN or particular device address is maintained. For example, as discussed above with respect to FIG. 4B and FIG. 4C, a L2 device maintains a mapping of a VLAN identifier (e.g., VLAN identifier field 442) to device port (e.g., port field 444), and/or a mapping of a device address (e.g., device address field 443) to device port (e.g., port field 444). An L3 device such as an ARP server or device implementing an ARP service, maintains, in some embodiments, a mapping from a device address (e.g., device address field 447), to an IP address (e.g., IP address field 448). Some embodiments of operation 705 include routing or forwarding one or more network messages based on the maintained address mapping.

In operation 710, an indication of the mapping is provided to a network controller. As discussed above, embodiments vary in how a network controller and a network device maintaining an address mapping communicate mapping information. Some embodiments implement a publish/subscribe scheme between the network controller and one or more network devices that maintain mapping information. In the publish/subscribe scheme, a network device subscribes, via the network controller, to address updates that occur on a particular VLAN or to a particular device address. Thus, in these embodiments, operation 710 includes subscribing to address updates of the address mapping(s) maintained by operation 705. In embodiments that implement this publish/subscribe scheme, the network controller maintains a list of subscribers to each VLAN and/or device address tracked or maintained by the network controller. The list is then consulted when an address rotation is detected by the network controller.

In other embodiments, the network controller proactively maintains a list of address mappings maintained by L2 and/or L2 devices. The list is maintained by the network controller querying L2 and/or L3 devices to retrieve their address mappings. The querying of these devices occurs periodically in at least some embodiments. Thus, in these embodiments, operation 710 includes receiving such a query from a network controller, and providing the mappings requested by the query (e.g. the mapping(s) maintained in operation 705). In some embodiments, the query for address mappings is generated via the Netconf network management protocol. Thus, in these embodiments, operation 710 includes responding to commands or queries generated by Netconf.

In operation 715, a notification of an address update is received. In some embodiments, the notification received in operation 715 includes one or more of the fields discussed above with respect to the address change message 500. In other embodiments, the notification is a "publication" message in response to a "subscription" made in operation 710. The publication message indicates that the VLAN or device address to which the network device has subscribed has experienced a change or update. This publication also includes, in some embodiments, one or more of the fields discussed above with respect to address change message 500.

In operation 720, the address mapping (of operation 705) is updated based on the notification of operation 715. Updating the address mapping includes, in some embodiments, replacing a "previous" device address indicated in the mapping with an updated device address indicated in the notification (e.g., via the second device address field 504). The device address to be replaced in the mapping is identified, in some embodiments, via another field of the notification (e.g., the first device address field 502).

In operation 730, a packet or message is routed based on the updated address mapping. For example, in some embodiments a packet is received that indicates a destination device address equivalent to the updated address indicated in the notification of operation 715. Because the mapping was updated in operation 720, a device performing the method 700 is able to locate routing information appropriate for the received message (e.g., a device port number to use when forwarding the received message). The device then routes the received message or packet according to the routing information (e.g., over a port specified by the mapping).

In some other embodiments, the received message is an ARP query, which requests a device address based on an IP address included in the ARP query. Because the mapping was updated in operation 720, a device performing the method 700 in this embodiment is able to transmit, responsive to the ARP query, an ARP response that indicates the updated device address (that was received in the notification of operation 715).

Figure 8:
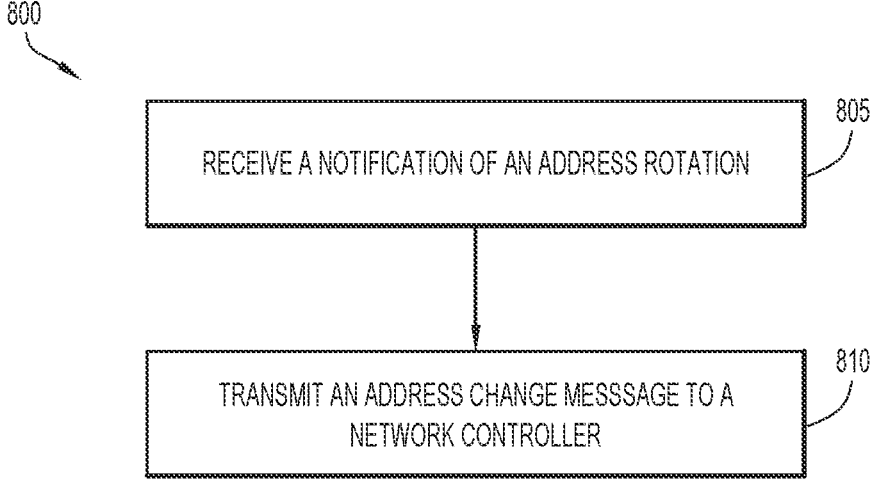
FIG. 8 is a flowchart of a method of notifying a network controller of an address rotation in accordance with an example embodiment.

FIG. 8 is a flowchart of a method 800 of notifying a network controller of an address rotation in accordance with an example embodiment. In some embodiments, the method 800 is performed by a wireless network controller, such as one or more of the wireless network controller 118, 206, or 306. As discussed above, in at least some embodiments, an access point or a wireless network controller detects that a wireless client device has rotated or otherwise modified its device address. To facilitate proactive notification of other network devices of the rotation, such as devices that provide routing, switching or other services for the wireless client device, information regarding the rotation is passed along to a network controller. The network controller maintains a list of devices that are or at least may be maintaining address mapping information for the wireless client device. By proactively updating this mapping information, operation of the network is improved by reducing the need for broadcast based address discovery methods.

In operation 805, a notification of an address rotation is received. For example, as discussed above with respect to the sequence diagram 200 or the sequence diagram 300, an access point, after detecting that a wireless client device has rotated its device address, notifies a wireless network controller of the rotation via an address change message (e.g., address change message 500). Similarly, upon receiving the notification that a wireless client device has rotated its device address, some embodiments of a wireless network controller (e.g., wireless network controller 206 or 306) notify a network controller (e.g., 308 or 408) of the address rotation.

In operation 810, an address change message (e.g., address change message 500) is transmitted to a network controller. For example, as discussed above with respect to sequence diagram 200 or sequence diagram 300, in at least some embodiments, the wireless network controller, upon receiving a notification of an address rotation from an access point, transmits a corresponding notification to a network controller.

Figure 9:
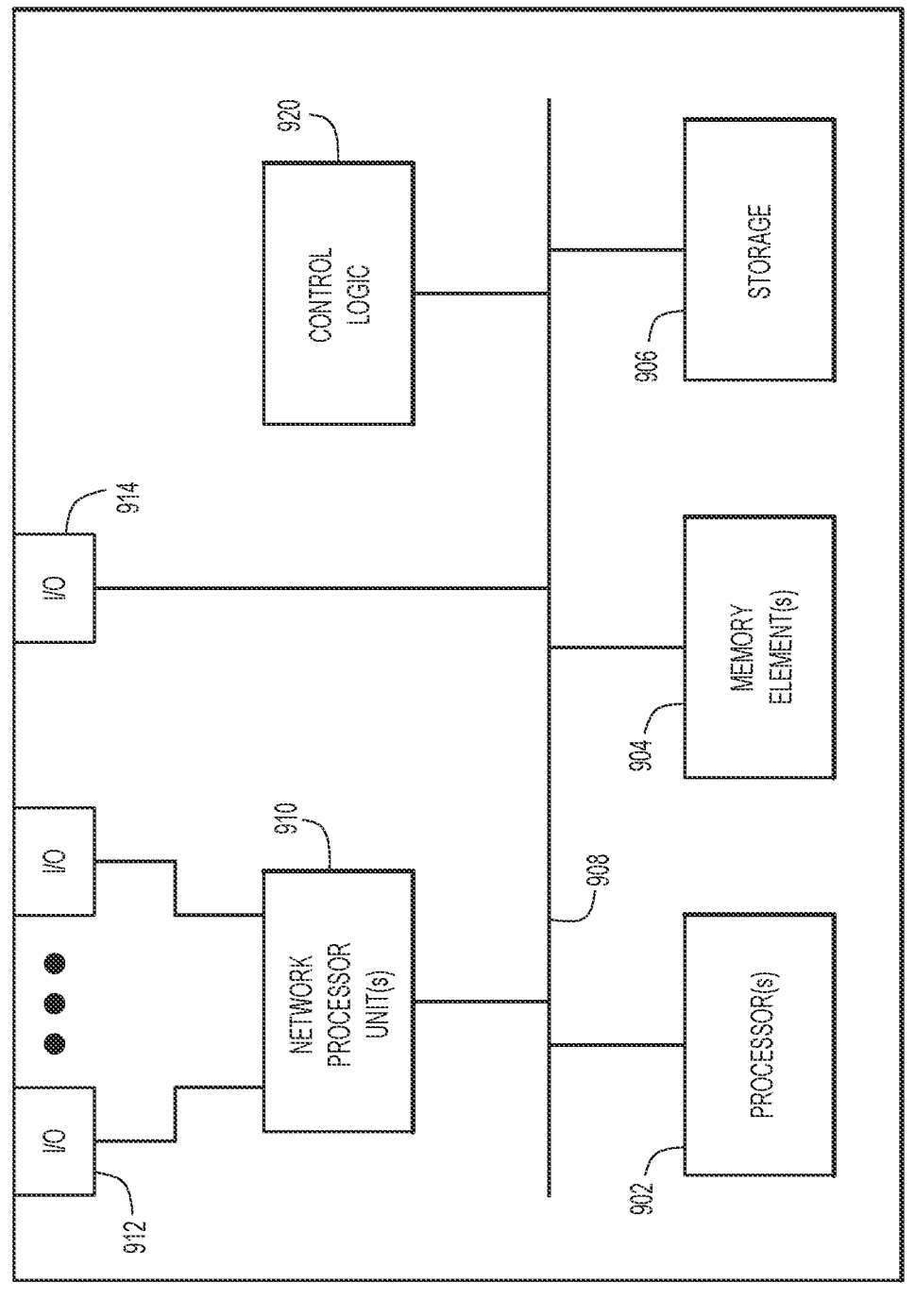
FIG. 9 is a hardware block diagram of a device that may perform functions associated with operations discussed herein in connection with the techniques depicted in any one or more of FIGS. 1-8.

FIG. 9 is a hardware block diagram of a device 900 that may perform functions associated with operations discussed herein in connection with the techniques depicted in any one or more of FIGS. 1-8. In various embodiments, any of the devices described above (e.g., an AP, a wireless network controller, a network controller, a switch, a router, or an ARP service) implement a computing architecture analogous to that described below with respect to the device 900.

In at least one embodiment, the device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for device 900 can overlap in any manner and are not limited to the specific allocation of instructions and/or operations described herein.

In at least one embodiment, processor(s) 902 is/are at least one hardware processor configured to execute various tasks, operations and/or functions for device 900 as described herein according to software and/or instructions configured for device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with device 900, and/or logic configured for memory element(s) 904 and/or storage 906. For example, any logic described herein (e.g., control logic 920) can, in various embodiments, be stored for device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of device 900 to communicate in order to exchange information and/or data. Bus 908 can be implemented with any architecture designed for passing control, data and/or information between processors, memory elements/storage, peripheral devices, and/or any other hardware and/or software components that may be configured for device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between device 900 and other systems, devices, or entities, via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 900 and other systems, devices, or entities to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to device 900. For example, I/O interface(s) 914 may provide a connection to external devices such as a keyboard, keypad, a touch screen, and/or any other suitable input and/or output device now known or hereafter developed. This may be the case, in particular, when the device 900 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 900 serves as a user device as described herein.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc-read only memory (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), Institute of Electrical and Electronics Engineers (IEEE) 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises maintaining a list of one or more network devices which store an address mapping of a wireless client device, the wireless client device identified via a first device address, receiving, from a wireless network controller, a notification that the wireless client device has rotated its device address from the first device address to a second device address, and notifying the one or more network devices included in the list of the rotation and of the second device address.

In another form, an apparatus is provided that comprises a network interface configured to enable network communications, one or more processors, and one or more memories storing instructions that when executed configure the one or more processors to perform operations comprising maintaining a list of one or more network devices which store an address mapping of a wireless client device, the wireless client device identified via a first device address, receiving, from a wireless network controller, a notification that the wireless client device has rotated its device address from the first device address to a second device address, and notifying the one or more network devices included in the list of the rotation and of the second device address.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
maintaining information for one or more network devices which store an address mapping of an Internet Protocol (IP) address to a first media access control (MAC) address of a wireless device, wherein the wireless device is identified via the first MAC address;
determining that the wireless device has rotated its MAC address from the first MAC address to a second MAC address; and
providing to the one or more network devices a notification that the wireless device has rotated its MAC address and of the second MAC address.

2. The method of claim 1, further comprising requesting address mappings of the wireless device from the one or more network devices, wherein the maintaining is based on the address mappings.

3. The method of claim 1, wherein the information further includes an address mapping that maps a virtual local area network (VLAN) identifier to the first MAC address, or the first MAC address to a port of a network device that stores the address mapping.

4. The method of claim 1, wherein the providing is configured to cause a network device to update a stored address mapping that references the first MAC address to instead reference the second MAC address.

5. The method of claim 1, wherein the maintaining comprises:
obtaining from a first network device an indication that the first network device is associated with the wireless device; and
adding the first network device to the information.

6. The method of claim 5, wherein the indication is a request to subscribe to updates of the wireless device.

7. The method of claim 5, further comprising deriving from the indication, address information of the first network device, wherein adding the first network device to the information comprises storing the address information in the information of one or more network devices.

8. The method of claim 1, further comprising: determining a virtual local area network (VLAN) in which the wireless device participates; and searching the information to identify a set of network devices participating in the VLAN, wherein the providing includes providing a notification to the set of network devices.

9. The method of claim 1, wherein providing the notification enables the one or more network devices to update stored information used to manage network communications.

10. The method of claim 9, wherein the stored information includes Address Resolution Protocol (ARP) information and/or information stored in Content Addressable Memory.

11. The method of claim 1, further comprising:
detecting address rotation; and
identifying a particular wireless device through address rotation by one or more network infrastructure devices, including one or more of: a wireless network controller, an access point, an authentication, authorization, and accounting (AAA) service, a dynamic host control protocol (DHCP) server, or other network infrastructure device or process.

12. An apparatus comprising:
a network interface configured to enable network communications;
one or more processors; and
one or more memories storing instructions that when executed configure the one or more processors to perform operations comprising:
maintaining information for one or more network devices which store an address mapping of an Internet Protocol (IP) address to a first media access control (MAC) address of a wireless device, wherein the wireless device is identified via the first MAC address;
determining that the wireless device has rotated its MAC address from the first MAC address to a second MAC address; and
providing to the one or more network devices a notification that the wireless device has rotated its MAC address and of the second MAC address.

13. The apparatus of claim 12, the operations further comprising requesting address mappings of the wireless device from the one or more network devices, and wherein the maintaining is based on the address mappings.

14. The apparatus of claim 12, wherein the information includes an address mapping that maps a virtual local area network (VLAN) identifier to the first MAC address, or the first MAC address to a port of a network device that stores the address mapping.

15. The apparatus of claim 12, wherein the providing is configured to cause a network device to update a stored address mapping that references the first MAC address to instead reference the second MAC address.

16. The apparatus of claim 12, wherein the providing comprises providing the notification to the one or more network devices to enable the one or more network devices to update stored information used to manage network communications.

17. The apparatus of claim 16, wherein the stored information includes Address Resolution Protocol (ARP) information and/or information stored in Content Addressable Memory.

18. The apparatus of claim 12, the operations further comprising:
detecting address rotation; and
identifying a particular wireless device through address rotation by one or more network infrastructure devices, including one or more of: a wireless network controller, an access point, an authentication, authorization, and accounting (AAA) service, a dynamic host control protocol (DHCP) server, or other network infrastructure device or process.

19. A non-transitory computer readable storage medium comprising instructions that when executed configure one or more processor to perform operations comprising:
maintaining information for one or more network devices which store an address mapping of an Internet Protocol (IP) address to a first media access control (MAC) address of a wireless device that is identified via the first MAC address;
determining that the wireless device has rotated its MAC address from the first MAC address to a second MAC address; and
providing to the one or more network devices a notification that the wireless device has rotated its MAC address and of the second MAC address.

20. The non-transitory computer readable storage medium of claim 19, wherein providing comprises providing the notification to the one or more network devices to enable the one or more network devices to update stored information used to manage network communications.

* * * * *